United States Patent
Schoenberger

(10) Patent No.: US 11,346,437 B2
(45) Date of Patent: May 31, 2022

(54) TRANSMISSION ASSEMBLY

(71) Applicant: Bayerische Motoren Werke Aktiengesellschaft, Munich (DE)

(72) Inventor: Stefan Schoenberger, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 202 days.

(21) Appl. No.: 16/809,786

(22) Filed: Mar. 5, 2020

(65) Prior Publication Data
US 2020/0200257 A1 Jun. 25, 2020

Related U.S. Application Data

(63) Continuation of application No. PCT/EP2018/076090, filed on Sep. 26, 2018.

(30) Foreign Application Priority Data

Nov. 7, 2017 (DE) ..................... 10 2017 219 789.7

(51) Int. Cl.
*F16H 57/025* (2012.01)
*F16H 57/02* (2012.01)

(52) U.S. Cl.
CPC . *F16H 57/025* (2013.01); *F16H 2057/02052* (2013.01)

(58) Field of Classification Search
CPC ............. F16H 57/02; F16H 57/025; F16H 2057/02052; F16H 2057/02026; F16H 2057/02047
See application file for complete search history.

(56) References Cited

U.S. PATENT DOCUMENTS

| 4,641,547 | A | 2/1987 | Stitch et al. |
| 7,194,932 | B1 | 3/2007 | Costello |
| 10,099,551 | B2 | 10/2018 | Iwasaki |
| 2011/0005854 | A1 | 1/2011 | Fsadni |
| 2015/0183318 | A1 | 7/2015 | Bandy |

FOREIGN PATENT DOCUMENTS

| DE | 10 2010 026 229 A1 | 1/2011 | | |
| DE | 10 2009 040 896 A1 | 3/2011 | | |
| DE | 10 2010 030 263 A1 | 12/2011 | | |
| DE | 11 2015 005 716 T5 | 9/2017 | | |
| DE | 112015005716 T5 | * 9/2017 | ........... | B60K 17/354 |
| GB | 2249607 A | * 5/1992 | ........... | F16H 57/023 |

OTHER PUBLICATIONS

International Search Report (PCT/ISA/210) issued in PCT Application No. PCT/EP2018/076090 dated Dec. 19, 2018 with English translation (six pages).
German-language Written Opinion (PCT/ISA/237) issued in PCT Application No. PCT/EP2018/076090 dated Dec. 19, 2018 (four pages).
German-language Search Report issued in German Application No. 10 2017 219 789.7 dated Sep. 5, 2018 with partial English translation (11 pages).

* cited by examiner

*Primary Examiner* — Thomas C Diaz
(74) *Attorney, Agent, or Firm* — Crowell & Moring LLP

(57) ABSTRACT

A transmission assembly has a transmission housing, a hinged support and a transfer case which form separate structural units. The transmission housing includes at least one common connection point by which the hinged support and the transfer case are jointly coupled to the transmission housing.

9 Claims, 1 Drawing Sheet

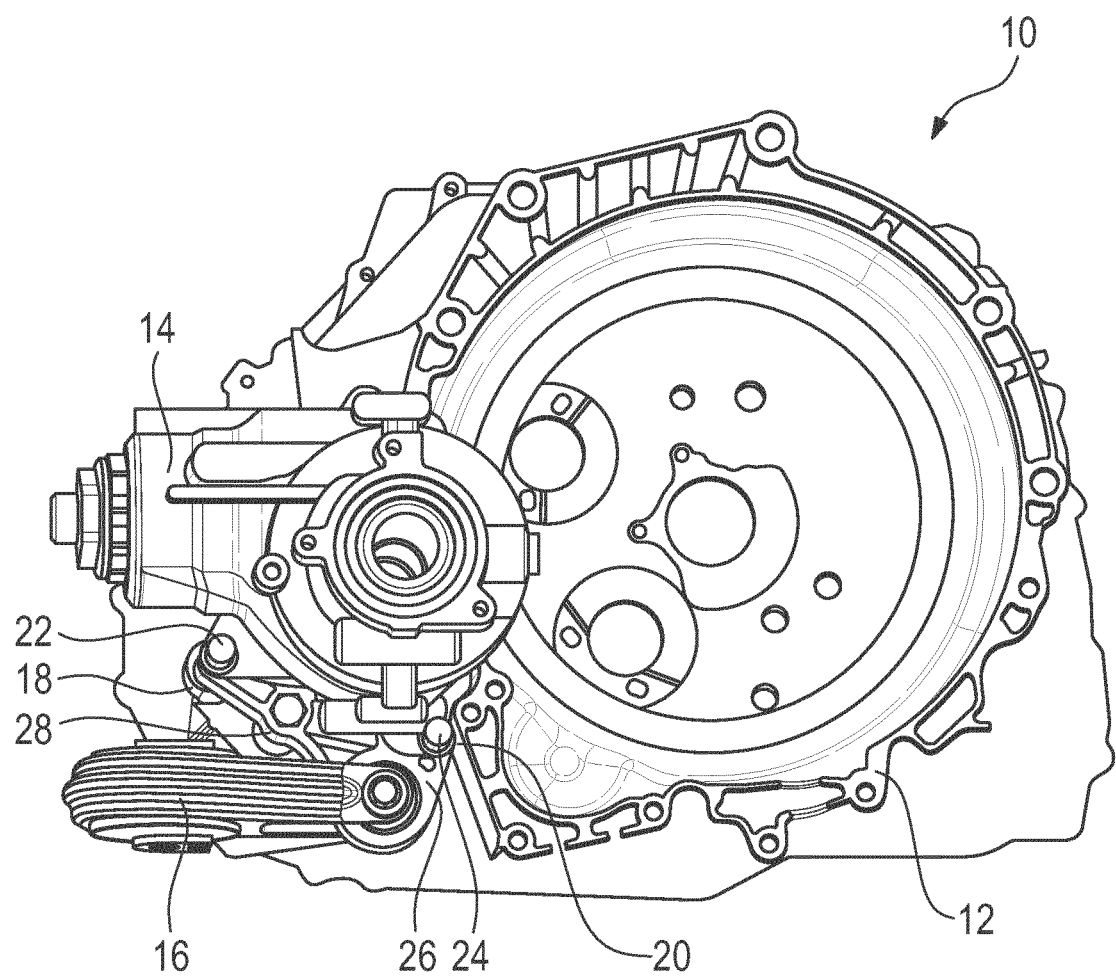

TRANSMISSION ASSEMBLY

CROSS REFERENCE TO RELATED APPLICATIONS

This application is a continuation of PCT International Application No. PCT/EP2018/076090, filed Sep. 26, 2018, which claims priority under 35 U.S.C. § 119 from German Patent Application No. 10 2017 219 789.7, filed Nov. 7, 2017, the entire disclosures of which are herein expressly incorporated by reference.

BACKGROUND AND SUMMARY OF THE INVENTION

The present invention relates to a transmission assembly for a motor vehicle.

To support the engine and transmission in motor vehicles, use is made, inter alia, of hinged supports. These can be fixedly attached to the engine or transmission. The hinged support is usually joined to the transmission housings by way of an adapter, which is attached to the hinged support, using two screws. Sprues and reinforcing elements are required for this purpose on the transmission housings.

However, the sprues and reinforcing elements increase the material usage in the transmission housing. The weight is also increased by the screws required. The assembly of the hinged support, which is normally carried out overhead in a rapidly repeating cycle, is also unfavorable, in particular awkward for a technician.

It is therefore an object of the present invention to provide a transmission assembly which enables simplified assembly and which also has as low a weight as possible.

This and other objects are achieved according to the invention by way of a transmission assembly, comprising a transmission housing, a hinged support and a transfer case, which form separate structural units, wherein the transmission housing includes at least one common attachment point, by way of which the hinged support and the transfer case are jointly coupled to the transmission housing. The transfer case is, for example, a power take-off unit, in particular an angular gearbox.

This has the advantage that the number of attachment points and the geometry of the transmission housing can be reduced in comparison with a transmission assembly in which the transfer case and the hinged support are fastened by way of separate attachment points. It is in particular possible to reduce the weight of the transmission housing by 500 g to 1000 g, for example by 700 g. In addition, fewer screws are required for assembly, which likewise results in a weight saving.

In this case, the hinged support and the transfer case can be fastened to the transmission housing directly, or indirectly, by way of at least one intermediate element.

However, to assemble the hinged support and the transfer case such that they cannot rotate, it is advantageous for the transmission assembly to comprise two attachment points. In this case, the hinged support and the transfer case can be fastened to the transmission housing in each case by way of the two attachment points.

The transmission assembly can comprise an adapter which is configured as a separate part, wherein the adapter is fastened to the at least one attachment point and wherein the hinged support is fastened to the adapter. The adapter permits the common use of the at least one attachment point without the need to adjust the geometry of the hinged support. Furthermore, by using the adapter, it is possible to use the same transmission housing in various series, in the case of which the hinged support has to be positioned differently. The position of the attachment points on the transmission can always be the same, and the geometry of the adapter can be adapted to the respective installation space situation.

According to a preferred embodiment, the hinged support is fastened to the transmission housing merely by way of the adapter. As a result, the positioning of the hinged support is particularly flexible.

The adapter is preferably arranged between the transfer case and the attachment point. Therefore, it is possible to pre-fix the adapter before the transfer case, in particular in a preassembly step.

The at least one attachment point can be configured as a screw boss. This makes the fastening of the hinged support and the transfer case particularly simple in terms of assembly.

In a variant, the transfer case and the adapter comprise screw holes which are aligned and by way of which the transfer case and the adapter are collectively screwed to the transmission housing, in particular to the at least one attachment point. The aligned screw holes permit the common use of the at least one attachment point.

The adapter is preferably pre-fixed to the transmission housing. This facilitates the subsequent assembly significantly, since it is not necessary to simultaneously hold and fasten two components.

For this purpose, the adapter is preferably pre-fixed by way of an additional attachment point, which is utilized only by the adapter. In this case, at least one further screw hole of the adapter is oriented such that it lies over the at least one attachment point by way of which the hinged support and the transfer case are intended to be collectively fastened to the transmission housing.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a transmission assembly according to an embodiment of the invention.

DETAILED DESCRIPTION OF THE DRAWING

The transmission assembly 10 comprises a transmission housing 12, a transfer case 14 and a hinged support 16, which are configured as separate components.

The transfer case 14 and the hinged support 16 are coupled, in particular fastened, to the transmission housing 12 by way of two common attachment points 18, 20 thereof.

The transmission housing 12 can be reinforced in the region of the attachment points 18, 20, in order to ensure a high level of stability. The fastening is preferably realized by use of two screws 22, 24, for example M12 screws. The attachment points 18, 20 are configured as screw bosses.

The transfer case 14 is fastened directly to the attachment points 18, 20, whereas the hinged support 16 is coupled to the transmission housing 12 indirectly by way of an adapter 26. In particular, the hinged support 16 is fastened to the transmission housing 12 merely by way of the adapter 26. For this purpose, the hinged support 16 is screwed to the adapter 26. The adapter 26 is configured as a separate component, for example a plastics injection-molded part. The geometry of the adapter 26 can determine the position of the hinged support 16.

The adapter 26 is preassembled on the transmission housing 12 by way of an additional attachment point 28, in particular a screw boss. However, the final fastening of the adapter 26 is likewise realized by way of the attachment points 18, 20. In this case, the adapter 26 is arranged between the transmission housing 12 and the transfer case 14.

By virtue of the fact that the adapter 26 and the transfer case 14 are collectively coupled to the transmission housing 12 by way of the attachment points 18, 20, the geometry of the transmission housing can be simplified. In particular, the number of sprues in the transmission housing 12 is reduced. Furthermore, fewer screws are required for fastening the components to the transmission housing. This results in a reduced weight of the transmission assembly 10.

The transfer case 14 and the adapter 26 have aligned screw holes. The screw holes are additionally aligned with the attachment points 18, 20 of the transmission housing 12. The transfer case 14 and the adapter 26 can therefore be collectively fastened to the attachment points 18, 20 of the transmission housing 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transmission assembly, comprising:
    a transmission housing;
    a hinged support;
    a transfer case; and
    an adapter which is configured as a separate part, wherein
    the transmission housing, the hinged support, and the transfer case form separate structural units,
    the transmission housing includes at least one common attachment point, by way of which the hinged support and the transfer case are jointly coupled to the transmission housing, and
    the adapter is fastened to the at least one attachment point and the hinged support is fastened to the adapter.

2. The transmission assembly according to claim 1, wherein
    the transmission assembly has at least two attachment points.

3. The transmission assembly according to claim 1, wherein
    the hinged support is fastened to the transmission housing only by way of the adapter.

4. The transmission assembly according to claim 3, wherein
    the adapter is arranged between the transfer case and the attachment point.

5. The transmission assembly according to claim 1, wherein
    the adapter is arranged between the transfer case and the attachment point.

6. The transmission assembly according to claim 1, wherein
    the at least one attachment point is configured as a screw boss.

7. The transmission assembly according to claim 1, wherein
    the transfer case and the adapter have screw holes which are aligned and by way of which the transfer case and the adapter are jointly screwed to the transmission housing.

8. The transmission assembly according to claim 1, wherein
    the transfer case and the adapter have screw holes which are aligned and by way of which the transfer case and the adapter are jointly screwed to the at least one attachment point of the transmission housing.

9. The transmission assembly according to claim 1, wherein
    the adapter is pre-fixed to the transmission housing.

* * * * *